United States Patent
Katsuda

(10) Patent No.: US 8,913,306 B2
(45) Date of Patent: Dec. 16, 2014

(54) DOCUMENT READING APPARATUS

(75) Inventor: Takeo Katsuda, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 445 days.

(21) Appl. No.: 13/187,986

(22) Filed: Jul. 21, 2011

(65) Prior Publication Data

US 2012/0026559 A1 Feb. 2, 2012

(30) Foreign Application Priority Data

Jul. 27, 2010 (JP) .................................. 2010-167897

(51) Int. Cl.
- H04N 1/04 (2006.01)
- G03G 15/00 (2006.01)
- H04N 1/00 (2006.01)
- H04N 1/23 (2006.01)
- H04N 1/46 (2006.01)

(52) U.S. Cl.
CPC ......... *G03G 15/607* (2013.01); *H04N 1/00795* (2013.01); *H04N 1/00814* (2013.01); *H04N 1/00835* (2013.01); *H04N 1/2307* (2013.01); *H04N 1/2346* (2013.01); *H04N 2201/0094* (2013.01)
USPC .......................................... 358/475; 358/509

(58) Field of Classification Search
CPC ............. G03F 15/607; H04N 1/00795; H04N 1/00814; H04N 1/00835; H04N 1/2307; H04N 1/2346; H04N 2201/0094
See application file for complete search history.

(56) References Cited

U.S. PATENT DOCUMENTS

2007/0201918 A1* 8/2007 Shoda et al. .................. 399/376
2008/0151036 A1* 6/2008 Iwai .............................. 347/260

FOREIGN PATENT DOCUMENTS

| JP | 6-309449 | 11/1994 |
| JP | 09-200448 | 7/1997 |
| JP | 2001-197269 | 7/2001 |
| JP | 2001197269 A | * 7/2001 |
| JP | 2004-357007 | 12/2004 |
| JP | 2009-118129 | 5/2009 |
| JP | 2009-239929 | 10/2009 |

OTHER PUBLICATIONS

Japanese Office Action, Notice of Reasons for Refusal, Patent Application No. 2010-167897. Date of drafting: Feb. 27, 2014 (4 pages).
English translation of Japanese Office Action, Notice of Reasons for Refusal, Patent Application No. 2010-167897. Date of drafting: Feb. 27, 2014 (6 pages).
Japanese Office Action, Notice of Reasons for Refusal, Patent Application No. 2010-167897. Date of Drafting: May 21, 2014 (3 pages).
English translation of Japanese Office Action, Notice of Reasons for Refusal, Patent Application No. 2010-167897. Date of Drafting: May 21, 2014 (4 pages).

* cited by examiner

*Primary Examiner* — Thierry L Pham
(74) *Attorney, Agent, or Firm* — Lucas & Mercanti, LLP

(57) ABSTRACT

Provided is a document reading apparatus capable of surely detecting the document cover open/closed state and the open/close operation, without being affected by the external environment. This document reading apparatus includes a light source, a linear reading device and a document cover. In this document reading apparatus, the light amount value of the light received by the linear reading section while the light source is turned on, and the light amount value of the light received by the linear reading section when the light source is turned off are used to detect the open/closed state and the open/close operation of the document cover, wherein the preparation for printing starts when the document cover has shifted from the open state to the closed state.

8 Claims, 6 Drawing Sheets

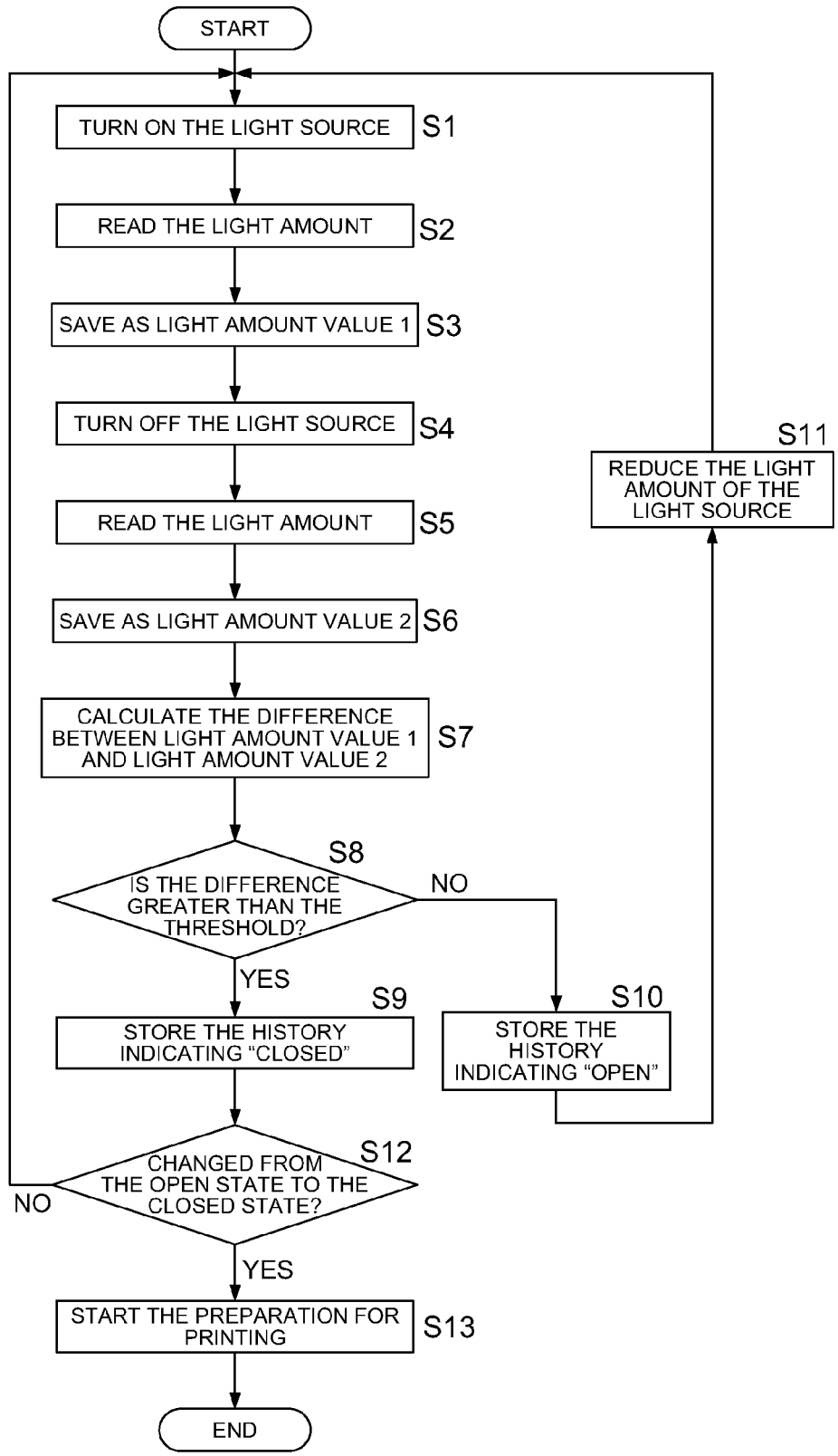

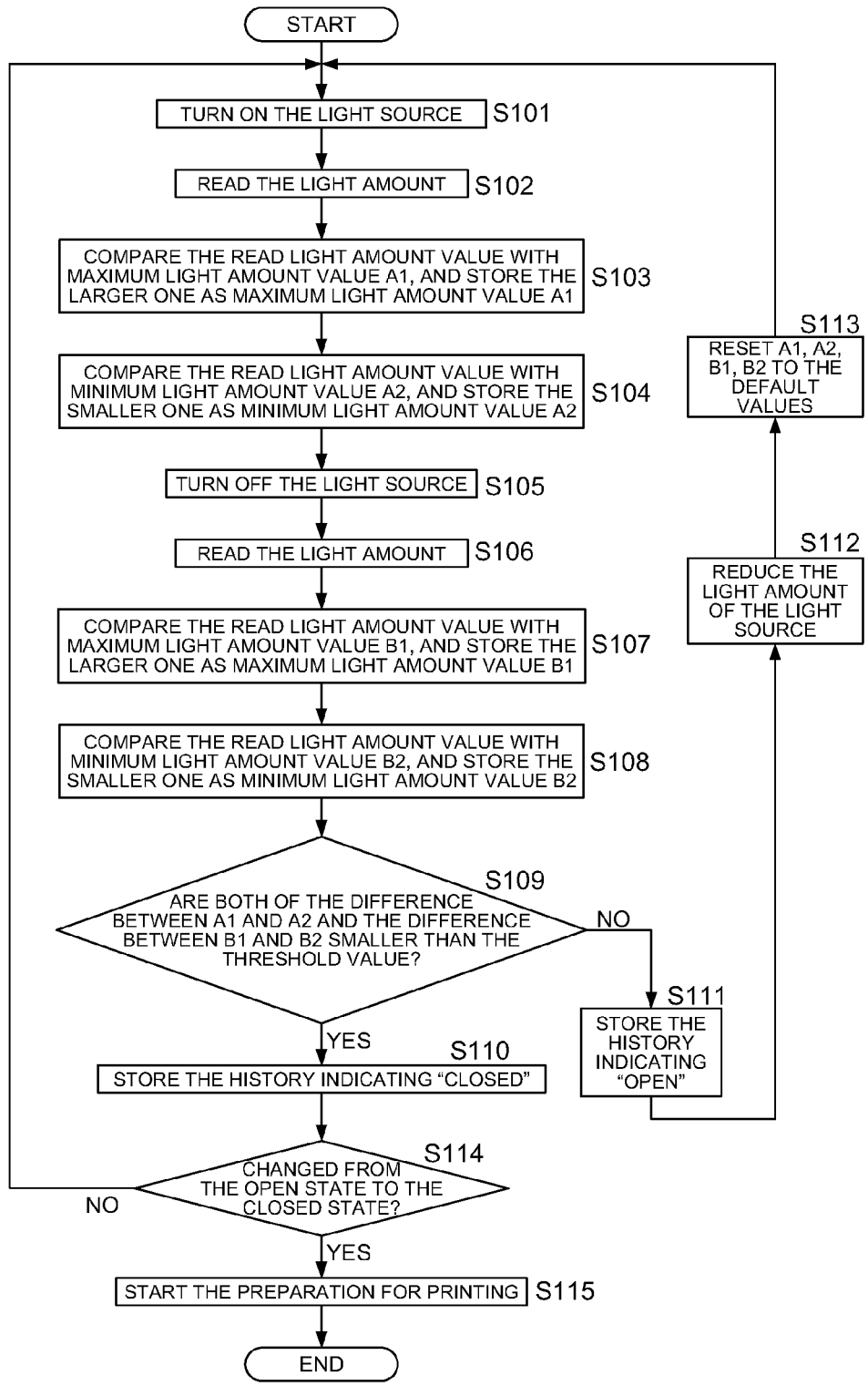

DOCUMENT READING APPARATUS

This application is based on Japanese Patent Application No. 2010-167897 filed on Jul. 27, 2010, with Japanese Patent Office, the entire content of which is hereby incorporated by reference.

TECHNICAL FIELD

The present invention relates to a document reading apparatus.

BACKGROUND

A document reading apparatus such as the scanner of a photocopier is generally equipped with a platen glass on which a document to be read is placed, and a document cover for bringing the mounted document in close contact with the platen glass.

In the field of document reading apparatuses, many proposals have been disclosed on the art of detecting an open/close operation of the document cover. They are disclosed, for example, in Japanese Unexamined Patent Application Publication No. H 06-309449, Japanese Unexamined Patent Application Publication No. 2004-357007, and Japanese Unexamined Patent Application Publication No. 2009-239929.

According to the technique described in Japanese Unexamined Patent Application Publication No. H 06-309449, the output value of a CCD sensor is monitored. The open/close operation of the document cover is detected by detecting the output of the CCD sensor to be increased by the light inside the room when the document cover is opened.

According to the technique disclosed in Japanese Unexamined Patent Application Publication No. 2004-357007, a control section inside the scanner determines, based on the detection signal value from the external light sensor, whether the intensity of the detected external light has been increased or not, and decreased or not, so that the open/close operation of document cover is detected.

Further, according to the technique introduced in Japanese Unexamined Patent Application Publication No. 2009-239929, a control section determines whether the document platen is being exposed to the external light or not, and the open/close operation of the document cover is thus detected.

However, with the method for detecting the open/close operation of the document cover disclosed in Japanese Unexamined Patent Application Publication No. H 06-309449, Japanese Unexamined Patent Application Publication No. 2004-357007, and Japanese Unexamined Patent Application Publication No. 2009-239929, the detection accuracy depends on the external environment, as exemplified by the case where detection accuracy deteriorates when the amount of external light is limited. Thus, the open/close operation of the document cover cannot be detected accurately.

SUMMARY

To achieve at least one of the abovementioned objects, a document reading apparatus reflecting one aspect of the present invention comprises:

a platen glass on which a document is to be placed;

a document cover provided over the platen glass so as to be opened and closed, the document cover pressing the document in close contact with the platen glass when the document cover is closed;

a light source configured to project light toward the platen glass from under the platen glass;

a light receiving section configured to receive the light projected from the light source; and an opening/closing detection section configured to detect an open/closed state of the document cover based on a light amount value of light received by the light receiving section while the light source is turned on and a light amount value of light received by the light receiving section while the light source is turned off.

The abovementioned document reading apparatus, wherein the opening/closing detection section preferably detects the open/closed state of the document cover by comparing a threshold value with a difference between the light amount value of the light received by the light receiving section while the light source is turned on and the light amount value of the light received by the light receiving section while the light source is turned off.

The abovementioned document reading apparatus, wherein the opening/closing detection section preferably detects the open/closed state of the document cover by comparing a threshold value with a difference between a maximum light amount value and a minimum light amount value of the light received by the light receiving section when the light source is turned on, and by comparing a threshold value with a difference between a maximum light amount value and a minimum light amount value of the light received by the light receiving section when the light source is turned off.

The abovementioned document reading apparatus preferably comprises:

a control section configured to control the light source to, when the opening/closing detection section detects that the document cover is opened, reduce an amount of the light projected from the light source.

The abovementioned document reading apparatus, wherein the light source preferably projects light on the document placed on the platen glass, and the light receiving section is preferably configured to receive light reflected on the document and obtain image information of the document.

The abovementioned document reading apparatus, wherein the light source is preferably a linear light source including a plurality of light emitting diodes arranged at least one-dimensionally.

BRIEF DESCRIPTION OF THE DRAWINGS

FIG. 5 is a flow chart showing the operation of detecting an open/close operation of an automatic document feeder and then starting the preparation for printing; and FIG. 6 is a flow chart showing the operation of detecting an open/close operation of an automatic document feeder and then starting the preparation for printing.

DETAILED DESCRIPTION OF THE PREFERRED EMBODIMENT

[Schematic Description of the Image Forming Apparatus]

Figure 1:
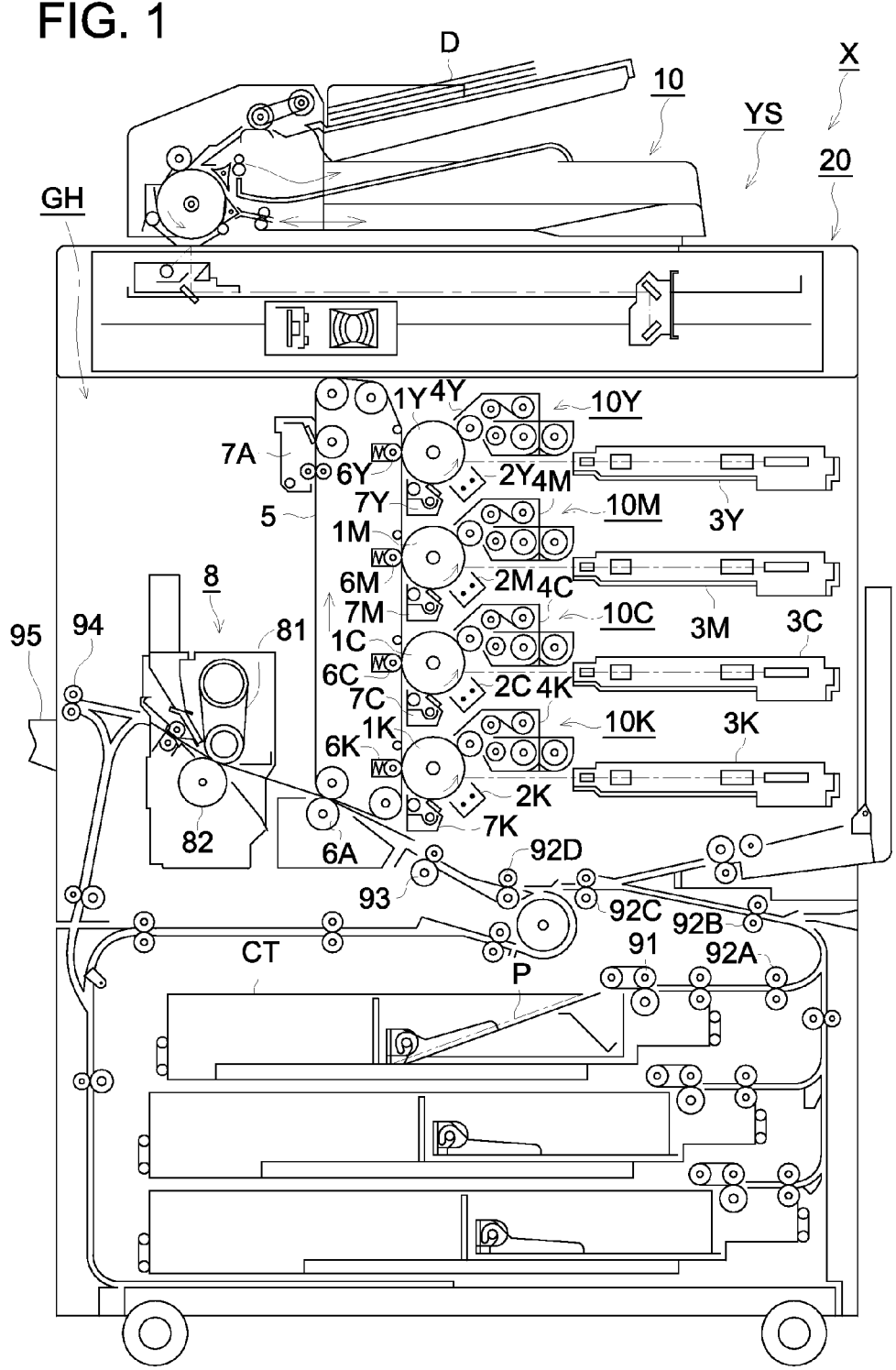
FIG. 1 is a central cross sectional view of an image forming apparatus.

FIG. 1 is a central cross sectional view of an image forming apparatus X.

The image forming apparatus X includes a document reading apparatus YS and an image forming apparatus main body GH. The image forming apparatus main body GH includes a plurality of image forming sections 10Y, 10M, 10C and 10K, and a belt-like intermediate transfer belt 5.

A document reading apparatus YS made up of an automatic document feeder 10, a reading section 20 and others are mounted on the top of the image forming apparatus main body GH. The document D placed on a document platen of the automatic document feeder 10 is conveyed by a sheet conveyance section, and the image on one or both sides of the document D is scanned and exposed to light by the optical system of the reading section 20. The image is then read by a linear reading section.

The signal generated by photoelectric conversion by means of the linear reading section is subjected to an analog processing, an analog-to-digital conversion, a shading correction, an image compression and other processings in the image processing section, and is then sent to the exposure sections 3Y, 3M, 3C and 3K.

The image forming section 10Y for forming a yellow (Y) image has a charging section 2Y, an exposure section 3Y, a developing section 4Y, and a cleaning section 7Y which are arranged around a photoconductor drum 1Y. The image forming sections 10M, 10C and 10K are configured in nearly the same structure as the image forming section 10Y. The developing sections 4Y, 4M, 4C and 4K include two-component developer made of small-diameter toners of yellow (Y), magenta (M), cyan (C) and black (K), and carriers. The toner includes pigment or dye serving as a coloring agent, wax for facilitating separation of the toner from a fixing belt 81 subsequent to fixing, and binder resin for binding these materials together.

The intermediate transfer belt 5 is rotatably supported by and around a plurality of rollers.

A fixing section 8 applies heat and pressure to the toner image on the sheet P at a nip portion formed between a heated fixing belt 81 and a pressure roller 82.

The images of the respective colors formed by the image forming sections 10Y, 10M, 10C and 10K are sequentially transferred onto the rotating intermediate transfer belt 5 by the transfer sections 6Y, 6M, 6C and 6K, whereby a color toner image is formed. The sheet P stored in a sheet feed cassette CT is fed by a sheet feed section 91, and is conveyed to a transfer section 6A via sheet feed rollers 92A, 92B, 92C and 92D and a registration roller 93. Then the color toner image are transferred onto the sheet P. The fixing section 8 applies heat and pressure to the sheet P with the color toner images transferred thereon, and the color toner image is fixed onto the sheet P. After that, the sheet is sandwiched by sheet ejection rollers 94 and is placed on a sheet ejection tray 95.

After the color toner image has been transferred onto the sheet P by the transfer section 6A, a cleaning section 7A removes toner remaining on the intermediate transfer belt 5 from which the sheet P has been separated.

[Schematic Description of Document Reading Apparatus]

Figure 2:
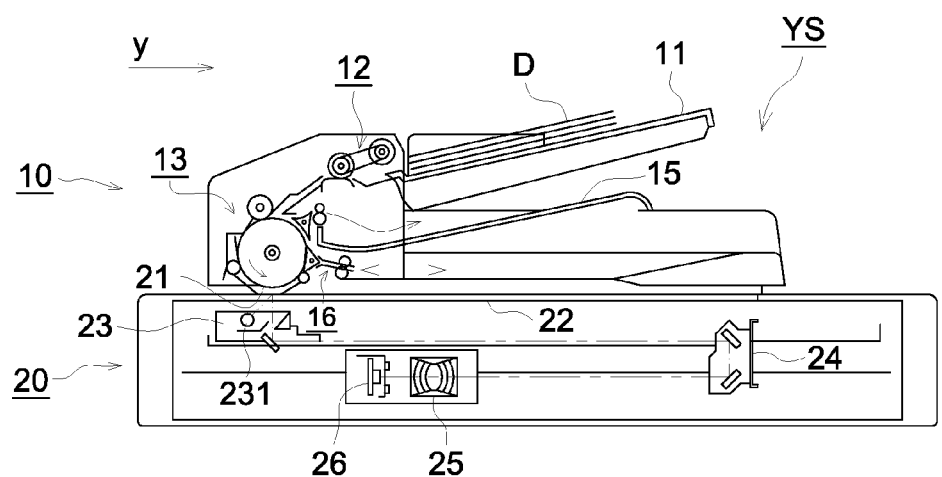
FIG. 2 is a central cross sectional view of a document reading apparatus.
Figure 3:
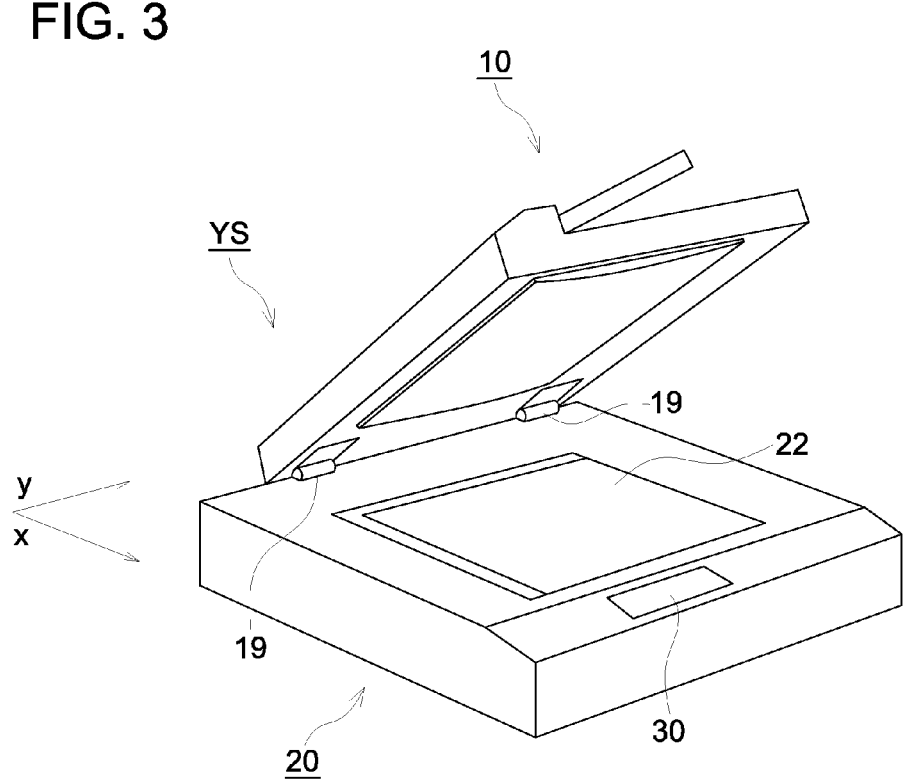
FIG. 3 is a perspective view of the document reading apparatus.

FIG. 2 is a central cross sectional view of the document reading apparatus YS. FIG. 3 is a perspective view showing the document reading apparatus YS. As shown in FIG. 2 and FIG. 3, the document reading apparatus YS includes an automatic document feeder 10, a reading section 20 and an operation section 30. The automatic document feeder 10 automatically feeds the set document D to the reading section 20. The reading section 20 reads the image of the document placed on a platen glass 22.

As shown in FIG. 3, the automatic document feeder 10 is mounted on the reading section 20 with a hinge section 19, and can be opened and closed with respect to the reading section 20. Further, the automatic document feeder 10 covers the platen glass 22, and when closed, brings the document in close contact with the platen glass 22. In this embodiment, the automatic document feeder 10 serves as a document cover.

When one document is placed on the platen glass 22, it is exposed to the light that is emitted from a light source 231 of the first mirror unit 23 and is broad in the main scanning direction (x direction in FIG. 3). The light source 231 is a linear light source made up of a plurality of light emitting diodes arranged at least one-dimensionally in the main scanning direction. The light reflected from the document goes via the first mirror unit 23, a second mirror unit 24 and an imaging lens 25, and an image is formed on a linear reading section (light receiving section) 26.

The linear reading section 26 reads the document image. The linear reading section 26 is configured with a line sensor made up of a plurality of image pickup devices arranged one-dimensionally in the main scanning direction, and in each image pickup device photoelectric conversion is conducted for each pixel. The linear reading section 26 reads the document image line by line in the main scanning direction.

The first mirror unit 23 having the light source 231 travels in the sub-scanning direction (y direction) perpendicular to the main scanning direction. The second mirror unit 24 moves in the same direction at the traveling speed which is half the traveling speed of the first mirror unit. Thus, the first mirror unit 23 and second mirror unit 24 travel in the sub-scanning direction with respect to the document on the platen glass 22, and this movement causes a reading area to move in the sub-scanning direction. The entire surface of the document can be scanned by the sequential movement of the reading area in the sub-scanning direction. The light reflected from the document is sequentially read by the linear reading section 26, and thus the image of one page of the document is read.

In the automatic document feeder 10, the separation roller 12 feeds a plurality of documents D placed on the document tray 11 onto a sheet conveyance path one by one. These documents are conveyed by a document sheet conveyance section 13 made up of a plurality of guide members and a plurality of rollers, and are ejected to a document ejection platen 15. The images of the documents D conveyed by the automatic document feeder 10 are read by the reading section 20 at the document image reading position 21 along the sheet conveyance path. To put it another way, the reading area is moved in the sub-scanning direction by moving the document.

In the case where images on both sides of a document are read, after the image on the top side of the document D has been read, the document D is reversed by a document reversing section 16 made up of a pair of rollers and a sheet conveyance path switching guide, and is then conveyed again to the document sheet conveyance section 13. The document is ejected to the document ejection platen 15 after the image on the reverse side has been read. As described above, in the document reading apparatus YS, not only the document placed on the platen glass 22 is directly read, but the document being conveyed by the automatic document feeder 10 can also be read.

As shown in FIG. 3, an operation section 30 is installed on the front side of the reading section 20. The operation section 30 is used to set the contents of reading operation in the document reading apparatus YS. The operation section 30 is designed in a touch panel structure, and can also be used to display the status of the reading operation being performed on the document reading apparatus YS.

Figure 4:
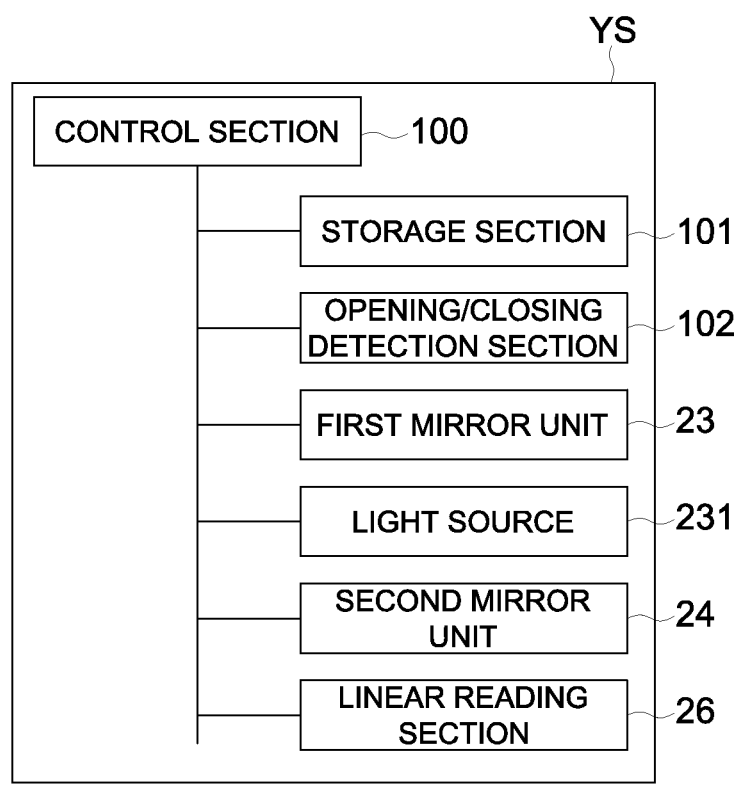
FIG. 4 is a block diagram showing a control configuration of the document reading apparatus.

FIG. 4 is a block diagram showing a control configuration of the document reading apparatus YS. Only atypical control configuration is illustrated.

The operations of various sections including a storage section 101 and an opening/closing detection section 102 in the document reading apparatus YS are controlled by a control section 100.

The control section 100 is configured mainly with a CPU (Central Processing Unit), a ROM (Read Only Memory), a RAM (Random Access Memory) and others. The control section 100 reads in various control programs stored in the ROM, extracts them in the RAM, and control operations of various sections.

The storage section 101 stores various forms of information in the document reading apparatus YS. When the control section 100 controls the operation of various sections, the information stored in the storage section 101 is referenced.

An opening/closing detection section 102 detects the open/closed state and open/close operation of the automatic document feeder 10. The detecting operation by the opening/closing detection section 102 will be described subsequently.

The operations of the first mirror unit 23, the light source 231, the second mirror unit 24, and the linear reading section 26 are controlled by the control section 100 so that the document placed on the platen glass 22 is read, as described above.

[Detection of Open/Closed State and Opening/Closing Operation]

The following describes the steps of detecting the open/close operation of the automatic document feeder 10 by the opening/closing detection section 102:

In the image forming apparatus X of FIG. 1, the operation in which the automatic document feeder 10 of the document reading apparatus YS changes its state from the open state to the closed state is detected. When the automatic document feeder 10 has changed its state from the open state to the closed state, it is judged that a document has been placed on the platen glass 22 by the user, and preparatory operations for printing are performed, for example, the polygon mirrors (not illustrated) installed in the exposure sections 3Y, 3M, 3C and 3K start to rotate, so that the first copy time is reduced.

FIG. 5 is a flow chart showing the operation of detecting the open/closed state and open/close operation of the automatic document feeder 10 and starting the preparation for printing.

To detect the open/closed state and the open/close operation of the automatic document feeder 10, the light source 231 of the document reading apparatus YS is turned on (step S1). The amount of the light received by the linear reading section 26 is read out (step S2), and the reading of the amount of the light is stored in the storage section 101 of the document reading apparatus YS as light amount value 1 (step S3). The light source is turned on in step S1 while the printing operation of the image forming apparatus X is suspended. Therefore, the light source 231 may be turned on step with the automatic document feeder 10 kept opened. In this case, the eyes of the user are dazzled by the glare of the light. To prevent the user from feeling discomfort to be dazzled, the time of turning on the light source 231 in step S1 is set at a short time (e.g., 100 ms).

The following specifically describes light amount value 1 stored in step S3: In the case where the automatic document feeder 10 is closed, the light coming from the light source 231 is reflected by the automatic document feeder 10, and is read by the linear reading section 26. Therefore, the reading of the light amount value is large. Thus, light amount value 1 stored in the storage section 101 has a large value.

On the other hand, when the automatic document feeder 10 is kept closed, the light emitted from the light source 231 is not reflected by the automatic document feeder 10, and only the external light coming from outside of the document reading apparatus is read by the linear reading section. Consequently, stored light amount value 1 has a value smaller than the value (corresponding to the external light) of the amount of the light which is read while the automatic document feeder 10 is closed.

After light amount value 1 has been stored in step S3, the light source 231 is turned off (step S4). The light amount of the light received by the linear reading section 26 is read (step S5), and the read light amount is stored as light amount value 2 in the storage section of the document reading apparatus YS (step S6).

The following specifically describes light amount value 2 stored in step S6: In the case where the automatic document feeder 10 is closed, the external light is cut off by the automatic document feeder 10, and there is no light being applied to the linear reading section 26. Thus, light amount value 2 is stored showing that the light amount is almost 0 (zero).

On the other hand, when the automatic document feeder 10 is kept opened, only the external light coming from outside of the document reading apparatus is read by the linear reading section 26. Consequently, the value corresponding to the external light is stored as light amount value 2.

After light amount value 1 and light amount value 2 have been stored in the storage section 101 of the document reading apparatus YS, the difference between light amount value 1 and light amount value 2 is calculated (step S7). The difference between light amount value 1 and light amount value 2 is compared with the predetermined threshold value. A decision step is taken to determine whether the difference is greater than the threshold value (step S8). The operation of the step S8 is performed by the opening/closing detection section 102 according to a prescribed program (See FIG. 4).

As described above, when the automatic document feeder 10 is closed, light amount value 1 has a large value, and light amount value 2 has a value which is almost 0 (zero). Thus, when the automatic document feeder 10 is closed, the difference between light amount value 1 and light amount value 2 has a large value (which is greater than the threshold value).

On the other hand, when the automatic document feeder 10 is open, both light amount value 1 and light amount value 2 correspond to the external light, and both of the values are almost the same, as described above. Therefore, independently of whether the external light is bright or dark, the difference between light amount value 1 and light amount value 2 has a value which is almost 0 (zero), (i.e., a value less than the threshold value).

Therefore, when the difference between light amount value 1 and light amount value 2 is greater than the threshold value (step S8: Yes), the open/closed status is stored in the storage section 101 (step S9) as a history, indicating that the automatic document feeder 10 is closed.

When the difference between light amount value 1 and light amount value 2 is smaller than the threshold value (step S8: No), the open/closed status is stored in the storage section 101, indicating that the automatic document feeder 10 is open (step S10). When the automatic document feeder 10 is open, there is no document placed on the platen glass 22, and there is no need to start the preparatory operation for printing. Thus, the operations from step S1 through step S8 are repeated. In this case, however, the light source 231 is controlled by the control section 100 to reduce the light amount of the light source 231 (step S11). This is intended to prevent the user from feeling discomfort with his eyes being dazzled by the glare of the light because the automatic document feeder 10 is open.

After the history, which indicates that the automatic document feeder 10 is closed, is additionally stored in step S9, the opening/closing detection section 102 references the history stored in the storage section 101. If the previous history indicates that the automatic document feeder 10 was open, it is determined that the automatic document feeder 10 has shifted from the open state to the closed state (step S12: Yes). This starts the preparatory operations for printing, including the rotation of the polygon mirrors installed in the exposure sections 3Y, 3M, 3C and 3K (step S13), on the assumption that the document has been placed on the platen glass 22. Accordingly, when the user presses the Start button of the image forming apparatus X, the printing operation can be started immediately, since the polygon mirror is already rotating on the steady-state basis, with the result that the first copy time is reduced.

As described above, depending on light amount value 1 of the right received by the linear reading section 26 while the light source 231 is turned on, and on light amount value 2 of the right received by the linear reading section 26 while the light source 231 is turned off, the open/closed state of the automatic document feeder is detected by comparing a threshold value with the difference between the light amount values. Thus, the open state and the closed state are clearly detected even if the lightness outside the document reading apparatus is high or low. In addition, by using the information on the past open/closed state and the current open/closed state, the open/close operation of the automatic document feeder 10 is detected without fail since it is not affected by the external environment. Consequently, the first copy time is reduced by, for example, starting the preparatory operations for printing, making use of the detection result of the open/close operation, as shown in FIG. 5.

The following describes the step of detecting the open/close operation of the automatic document feeder 10 in a manner different from that of the operation given in FIG. 5, using the light amount value of the light received by the linear reading section 26 while the light source 231 is turned on, and the light amount value of the light received by the linear reading section 26 while the light source 231 is turned off.

FIG. 6 is a flow chart showing the operation of detecting the open/closed state and open/close operation of the automatic document feeder 10, and starting the preparation for printing. In the initial state in FIG. 6, the automatic document feeder 10 is assumed to be closed. It is also assumed that a default value of 0 (zero) is used for a maximum light amount value A1 and a maximum light amount value B1 used in the steps S103, S104, S107 and S108, and a default value of 200 (the value twice the amount of the light received by the linear reading section 26 while the light source 231 is turned and the automatic document feeder 10 is closed) is used for the minimum light amount value A2 and a minimum light amount value B2.

First, to detect the open/close operation of the automatic document feeder 10, the light source 231 of the document reading apparatus YS is turned on (step S101) to read the amount of the light received by the linear reading section 26 (step S102).

Then, the read value of the light amount and the existing maximum light amount value A1 are compared with each other, and the greater one is stored in the storage section 101 as a new maximum light amount value A1 (step S103). the read value of the light amount and the existing minimum light amount value A2 are compared with each other, and the smaller one is stored in the storage section 101 as a new minimum light amount value A2 (step S104).

The following specifically describes step S103 and step S104: In the initial state, the automatic document feeder 10 is closed. Thus, the light applied from the light source 231 is reflected on the automatic document feeder 10, and is read by the linear reading section 26. The value of the amount of the light having been read is "100" in the present embodiment. Since the value of the amount of the light having been read in step S103 is "100" and the default value for the maximum light amount value A1 is "0", the value "100" is stored as a new maximum light amount value A1. Further, since the value of the amount of the light having been read in step S104 is "100" and the default value of the minimum light amount value A2 is "200", the value "100" is stored as a new minimum light amount value A2.

After the maximum light amount value A1 and the minimum light amount value A2 have been stored in step S103 and step S104, the light source 231 is turned off (step S105). The amount of the light received by the linear reading section 26 is then read (step S106).

Then, the read value of the light amount and the existing maximum light amount value B1 are compared with each other, and the greater one is stored in the storage section 101 as a new maximum light amount value B1 (step S107). The read value of the light amount and the existing minimum light amount value B2 are compared with each other, and the smaller one is stored in the storage section 101 as a new minimum light amount value B2 (step S108).

The following specifically describes step S107 and step S108: In the initial state, the automatic document feeder 10 is closed. Thus, the external light is cut off by the automatic document feeder 10, and any light is applied to the linear reading section 26. Therefore, the value of the amount of the read light is "0". In step S106, since the value of the amount of the read light is "0" and the default value of the maximum light amount value B1 is "0", the value "0" is stored as a new maximum light amount value B1. Further, since the value of the amount of the read light is "0" and the default value for the minimum light amount value B2 is "200" in step S106, the value "0" is stored as a new minimum light amount value B2.

After the maximum light amount value A1 and the minimum light amount value A2 at the time of the light source being turned on, and the maximum light amount value B1 and the minimum light amount value B2 at the time of the light source being turned off have been stored in the storage section 101 of the document reading apparatus YS, a decision step is taken to determine whether the difference between the maximum light amount value A1 and the minimum light amount value A2 at the time of the light source being turned on is smaller than the threshold value ("50" in the present embodiment) as a standard or whether the difference between the maximum light amount value B1 and the minimum light amount value B2 at the time of the light source being turned off is smaller than the threshold value ("50" in the present embodiment) as a standard (step S109). The operation in the step S109 is performed according to a prescribed program by the opening/closing detection section 102 (see FIG. 4).

In the initial state, the automatic document feeder 10 is closed. Thus, in the initial operation of the step S101 through S108, the storage section 101 stores:

Maximum light amount value A1: 100
Minimum light amount value A2: 100
Maximum light amount value B1: 0
Minimum light amount value B2: 0

Thus, both the difference between A1 and A2 and the difference between AB and B2 are "0", which is smaller than the threshold value (50). Thus, the storage section 101 stores the history indicating that the automatic document feeder 10 is closed (S110). Then the opening/closing detection section 102 references the history stored in the storage section 101, and determines that the automatic document feeder 10 was not moved the open state to the closed state in the initial operation (step S114: No). The system goes back to the step S101.

Going back to step S101, the following describes the case where automatic document feeder 10 has been moved from the closed state to the open state.

While the automatic document feeder 10 is open, both the value of the amount of the light read by the linear reading section 26 (step S102) at the time of the light source 231 being turned on, and the value of the amount of the light read by the linear reading section 26 (step S106) at the time of the light source 231 being turned off corresponds to the quantity of the external light.

First, the following describes the case where the external light is bright at the place where the image forming apparatus X is installed: For example, assume that the external light is bright, and the value of the amount of the light read by the linear reading section 26 in step S102 and step S106 is "60". In the initial operations in step S101 through step S110 and the operations in step S101 through step S110 performed after step S114, the storage section 101 stores:

Maximum light amount value A1: 100
Minimum light amount value A2: 60
Maximum light amount value B1: 60
Minimum light amount value B2: 0

As a result, the difference between A1 and A2 is "40", and the difference between B1 and B2 is "60". Thus, the difference between B1 and B2 is greater than the threshold value "50"; therefore, step S109 results in "No", and the history is stored, in the storage section 101, indicating that the automatic document feeder 10 is open (step S111).

The following describes the case where the external light is dark at the place where the image forming apparatus X is installed: For example, assume that the external light is dark, and the value of the amount of the light read by the linear reading section 26 in step S102 and step S106 is "10". In the initial operations in step S101 through step S110 and the operations in step S101 through step S110 performed after step S114, the storage section 101 stores:

Maximum light amount value A1: 100
Minimum light amount value A2: 10
Maximum light amount value B1: 10
Minimum light amount value B2: 0

As a result, the difference between A1 and A2 is "90", and the difference between B1 and B2 is "10". Thus, the difference between A1 and A2 is greater than the standard threshold "50"; therefore, step S109 results in "No", and the history is stored, in the storage section 101, indicating that the automatic document feeder 10 is open (step S111).

That is, in the initial operations of step S101 through step S110 and the operations of the initial step S101 through step S18 performed after step S114, the difference between A1 and A2 and the difference between B1 and B2 are each compared with the threshold value. Thus, the automatic document feeder 10 can be determined to be open, even if the external light is bright or not.

If the automatic document feeder 10 is open, a document is not yet placed on the platen glass 22, and there is no need for starting the preparatory operation for printing. Thus, the operations from step S101 through step S109 are repeated. In this case, however, the light source 231 is controlled by the control section 100 to reduce the light amount value of the light source 231 (step S112). This is intended to minimize the discomfort of the user when his eyes are dazzled by the glare of the light if the automatic document feeder 10 is open. Further, the A1, A2, B1 and B2 are reset to the default value (where the default values of the A1 and B1 are reset to the value "0", and those of the A2 and B2 are set to the value "200") (step S113).

The operations of step S101 through step S109 are repeated as described above. In step S110, if the history is stored to indicate that the automatic document feeder 10 is closed, and the history information which is stored in the storage section 101 and referenced by the opening/closing detection section 102 shows that the previous history indicate that "the automatic document feeder 10 is open", it is determined that the automatic document feeder 10 is changed to the closed state from the open state (step S114: Yes), and the preparatory operations, including the rotation of the polygon mirrors installed on the exposure sections 3Y, 3M, 3C and 3K are started (step S115). As a result, when the user presses the start button of the image forming apparatus X, the printing operation can be started immediately, since the polygon mirror is already rotating on the steady-state basis, with the result that the first copy time is reduced.

As described above, the difference between the maximum light amount value and the minimum light amount value of the light received by the linear reading section 26 while the light source 231 is turned on is compared with the threshold value. Further, the difference between the maximum light amount value and the minimum light amount value of the light received by the linear reading section 26 while the light source 231 is turned off is also compared with the threshold value. With this method, even if the external light outside the image forming apparatus is bright or not, it clearly determined whether the automatic document feeder 10 is open or closed. This arrangement allows detecting the open/close operation of the automatic document feeder 10 with certainty, without being affected by the external environment. For example, the result of detecting the open/close operation can be used to start the preparatory operations for printing, thereby reducing the first copy time, as shown in FIG. 6.

The embodiments of the present invention have been described with reference to FIG. 1 through FIG. 6, however, it should be expressly understood that the present invention is not restricted thereto. The embodiment is still included in the present invention if it is subjected to variation or addition without departing from the spirit and scope of the present invention.

In the present embodiment, the open/close operation of the automatic document feeder 10 is detected, by using the light source 231 and the linear reading section 26 employed for the document reading operation in the document reading apparatus YS, thereby reducing the cost. However, a light source and a reading section can be installed, separately from the still installed light source and reading section, to detect the open/close operation of the automatic document feeder 10.

Further, in the present embodiment, the open/close operation of the automatic document feeder 10 is detected by the light source 231 utilizing a highly responsive light emitting diode. To minimize the discomfort of the user when his eyes are dazzled by the glare of the light when the automatic document feeder 10 is open, the open/close operation of the automatic document feeder 10 can be detected by the light applied from only some part of the light emitting diodes in the light source 231.

Further, the light source for emitting in the outside of the visible region can be used as a light source for detecting the open/closed state and open/close operation, and this light cannot be identified by the user even when the automatic document feeder 10 is open. This arrangement eliminates the possibility of giving discomfort to the user.

With the document reading apparatus of the embodiment of the present invention, it is possible to surely detect the open/close operation of the document cover, without being affected by the external environment.

In any one of the aforementioned embodiments, the state where the platen glass is covered by the automatic document feeder to be shielded from the external light is detected as the state where the automatic document feeder 10 as a document cover is closed. To put it another way, in either of the state where the automatic document feeder 10 is actually opened or the state where the platen glass is covered with a document, it is determined that the automatic document feeder 10 is closed. Thus, the detection of the open/closed state of the document cover and the open/close operation of the present invention includes not only the detection of the document cover covering the platen glass but also the document covering the platen glass.

What is claimed is:

1. A document reading apparatus comprising:
    a platen glass on which a document is to be placed;
    a document cover provided over the platen glass so as to be opened and closed, the document cover pressing the document in close contact with the platen glass when the document cover is closed;
    a light source configured to emit light toward the platen glass from under the platen glass;
    a sensor which reads the amount of the light coming from the light source when the light source is turned on and when the light source is turned off; and
    a controller which detects an open state of the document cover based on both a light amount value read by the sensor when the light source is turned on and a light amount value read by the sensor when the light source is turned off, and detects a closed state of the document cover based on both the light amount value read by the sensor when the light source is turned on and the light amount value read by the sensor when the light source is turned off.

2. The document reading apparatus of claim 1, wherein the controller detects the open state of the document cover when a difference between the light amount values read by the sensor when the light source is turned on and when the light source is turned off is smaller than a threshold value, and the controller detects the closed state of the document cover when the difference between the light amount values read by the sensor when the light source is turned on and when the light source is turned off is greater than the threshold value.

3. The document reading apparatus of claim 1, further comprising:
    a storage section configured to store a history of the open state and the closed state of the document cover wherein the controller detects the open state and the closed stated of the document cover based on the most recent state of the document cover stored in the storage section and a comparison of a threshold value with a difference between a maximum light amount value and a minimum light amount value read by the sensor when the light source is turned on and turned off.

4. The document reading apparatus of claim 1, wherein the controller controls the light source to reduce an amount of the light projected emitted from the light source when the controller detects that the document cover is opened.

5. The document reading apparatus of claim 1, wherein the light source emits light on the document placed on the platen glass, and the sensor reads light reflected on the document and obtains image information of the document.

6. The document reading apparatus of claim 1, wherein the light source is a linear light source including a plurality of light emitting diodes arranged at least one-dimensionally.

7. The document reading apparatus of claim 6, wherein when the controller detects the open state or the closed stated of the document cover, only a part of the plurality of light emitting diodes emits light.

8. An image forming apparatus, comprising:
    the document reading apparatus of claim 1; and
    the controller starts a preparatory operation for a printing operation in the image forming apparatus when the controller detects that the document cover is closed after the controller detects that the document cover is opened.

* * * * *